(12) United States Patent
Kim et al.

(10) Patent No.: US 11,861,121 B2
(45) Date of Patent: Jan. 2, 2024

(54) ELECTRONIC DEVICE COMPRISING METAL MESH TOUCH ELECTRODE

(71) Applicant: Samsung Electronics Co., Ltd., Gyeonggi-do (KR)

(72) Inventors: Minuk Kim, Gyeonggi-do (KR); Jihwan Kim, Gyeonggi-do (KR); Hoondo Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 17/580,808

(22) Filed: Jan. 21, 2022

(65) Prior Publication Data

US 2022/0147193 A1 May 12, 2022

Related U.S. Application Data

(63) Continuation of application No. PCT/KR2020/009649, filed on Jul. 22, 2020.

(30) Foreign Application Priority Data

Jul. 23, 2019 (KR) .................. 10-2019-0089088

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04112* (2013.01)

(58) Field of Classification Search
CPC ...... G06F 3/041–047; G06F 2203/041–04114; G06F 1/1643;

(Continued)

(56) References Cited

U.S. PATENT DOCUMENTS

| 2014/0225871 | A1  | 8/2014 | Kim et al. |
| 2014/0226089 | A1* | 8/2014 | Guard ................. H10K 59/40 |
| | | | 349/12 |

(Continued)

FOREIGN PATENT DOCUMENTS

| EP | 2765450 A1 | 8/2014 |
| KR | 10-2015-0046668 A | 4/2015 |

(Continued)

*Primary Examiner* — Sanjiv D. Patel

(74) *Attorney, Agent, or Firm* — Cha & Reiter, LLC

(57) ABSTRACT

The disclosure relates to an electronic device comprising a metal mesh touch electrode. The electronic device may include: a display panel comprising an active area in which data is displayed, and an edge area formed along the outer peripheral surface of the active area; a substrate positioned on the display panel, the substrate comprising a first area corresponding to the active area and a second area corresponding to the edge area; a metal mesh electrode pattern formed in the first area and the second area; and multiple trace wires positioned on the substrate and electrically connected to the metal mesh electrode pattern. The metal mesh electrode pattern may comprise a first electrode pattern having a lattice structure, and a second electrode pattern having a lattice structure, the second electrode pattern being positioned on top of the first electrode pattern and disposed so as to crisscross the first electrode pattern. A single-wired portion may be formed in at least a partial area of the metal mesh electrode pattern formed in the second area.

20 Claims, 14 Drawing Sheets

(58) Field of Classification Search
CPC ....... G06F 2203/04102; G06F 3/04164; G06F 3/0443; G06F 3/0446; G06F 3/14; G06F 2203/04112; G06F 2203/04103; G06F 3/0412; G06F 3/0445; H10K 59/40; H10K 59/12; H10K 59/123; H10K 59/131; H10K 71/00; G02F 1/133528; G02B 5/3025

See application file for complete search history.

(56) References Cited

U.S. PATENT DOCUMENTS

| | | |
|---|---|---|
| 2015/0070312 A1 | 3/2015 | Her et al. |
| 2016/0070394 A1* | 3/2016 | Van Ostrand ........... G06F 3/047 345/173 |
| 2016/0103526 A1 | 4/2016 | Sohn |
| 2016/0240602 A1 | 8/2016 | Ki et al. |
| 2019/0107908 A1 | 4/2019 | Zeng et al. |
| 2019/0255818 A1* | 8/2019 | Ueki ..................... G06F 3/0448 |
| 2020/0033996 A1* | 1/2020 | Zhong ................ G06F 3/04164 |

FOREIGN PATENT DOCUMENTS

| | | |
|---|---|---|
| KR | 10-2016-0022620 A | 3/2016 |
| KR | 10-2016-0041608 A | 4/2016 |
| KR | 10-2017-0066535 A | 6/2017 |

* cited by examiner

ELECTRONIC DEVICE COMPRISING METAL MESH TOUCH ELECTRODE

CROSS-REFERENCE TO RELATED APPLICATION(S)

This application is a continuation of International Application No. PCT/KR2020/009649 filed on Jul. 22, 2020, which claims priority to Korean Patent Application No. 10-2019-0089088, filed on Jul. 23, 2019 in the Korean Intellectual Property Office, the disclosures of which are herein incorporated by reference.

TECHNICAL FIELD

One or more embodiments of the disclosure relate to an electronic device including a metal-mesh electrode based touch panel.

BACKGROUND ART

A touchscreen panel serves as an input device in an electronic device configured to recognize the position of contact or pressing on a screen by a user's hand, pen, or the like to activate a certain function.

Touchscreen panels are classified into resistive, capacitive, ultrasonic, and infrared touchscreens. Among the various types of touchscreen panels, the capacitive touchscreen panels are commonly implemented in mobile devices due to advantages such as high reliability, excellent performance, fast response rates, and multitouch implementation.

A capacitive touchscreen panel typically includes a driving electrode and a sensing electrode formed on separate layers, which operates to measure the change in electrical field formed between the two electrodes when an object (for example, user's hand) touches the touchscreen, thereby recognizing a touch input.

Due to the superior characteristics of high levels of conductivity and transmittance, indium tin oxide (ITO) electrodes are commonly applied to capacitive touchscreen panels.

However, ITO electrodes have high resistance values and thus are inappropriate for large touchscreen panels. Also, internal cracking and electric characteristic degradation occur if the same are bent, thereby making it difficult to implement when flexible characteristics are desired. Therefore, there has been a need for an alternative to ITO electrodes.

In an attempt to replace ITO electrodes, it has been proposed to utilize metal (for example, silver, copper) mesh electrodes having different resistances from ITO to touchscreen panels. Even in this case, however, there is a limitation in that metal mesh electrodes must formed in a similar structure to the ITO electrode pattern, which in turn causes undesired interference (delta capacitance) to occur between a sensing (or driving) trace wire and a driving (or sensing) metal mesh electrode, thereby causing a ghost touch.

Accordingly, the disclosure provides an electronic device capable of preventing unnecessary interference between a metal mesh electrode and a trace wire in order to address the above-mentioned limitation.

SUMMARY

An electronic device according to certain embodiments may include a display panel including an active area in which data is displayed and an edge area which is disposed along an outer circumferential surface of the active area, a substrate which is positioned on the display panel and includes a first area corresponding to the active area and a second area corresponding to the edge area, a metal mesh electrode pattern which is disposed on the first area and the second area, and a plurality of trace wires which are positioned on the substrate and are electrically connected to the metal mesh electrode pattern, wherein the metal mesh electrode pattern includes a first electrode pattern having a lattice structure, and a second electrode pattern which is positioned above the first electrode pattern and having a lattice structure, the first and second electrode patterns being disposed to intersect with each other, and wherein a disconnection part is disposed at at least a partial area of the metal mesh electrode pattern disposed on the second area.

An electronic device according to certain embodiments may include a display panel including an active area in which data is displayed and an edge area which is disposed along an outer circumferential surface of the active area, a substrate which is positioned on the display panel and includes a first area corresponding to the active area and a second area corresponding to an edge area, a metal mesh electrode pattern which is disposed on the first area and the second area, and a plurality of trace wires which are positioned on the substrate and electrically connected to the metal mesh electrode pattern, wherein the metal mesh electrode pattern includes a first electrode pattern which has a lattice structure and a second electrode pattern which is positioned above the first electrode pattern and has a lattice structure, the first and second electrode patterns being disposed to intersect with each other, the first electrode pattern and the second electrode pattern are provided at the first area, and only one of the first electrode pattern and the second electrode pattern is provided at at least a partial area of the second area.

An electronic device according to certain embodiments may minimize unnecessary interference between a metal mesh electrode and a trace wire while maintaining precision of touch recognition regarding a display edge area of the user through a new touch electrode pattern structure.

As a result, the electronic device according to certain embodiments may prevent a ghost touch.

DETAILED DESCRIPTION

Figure 1:
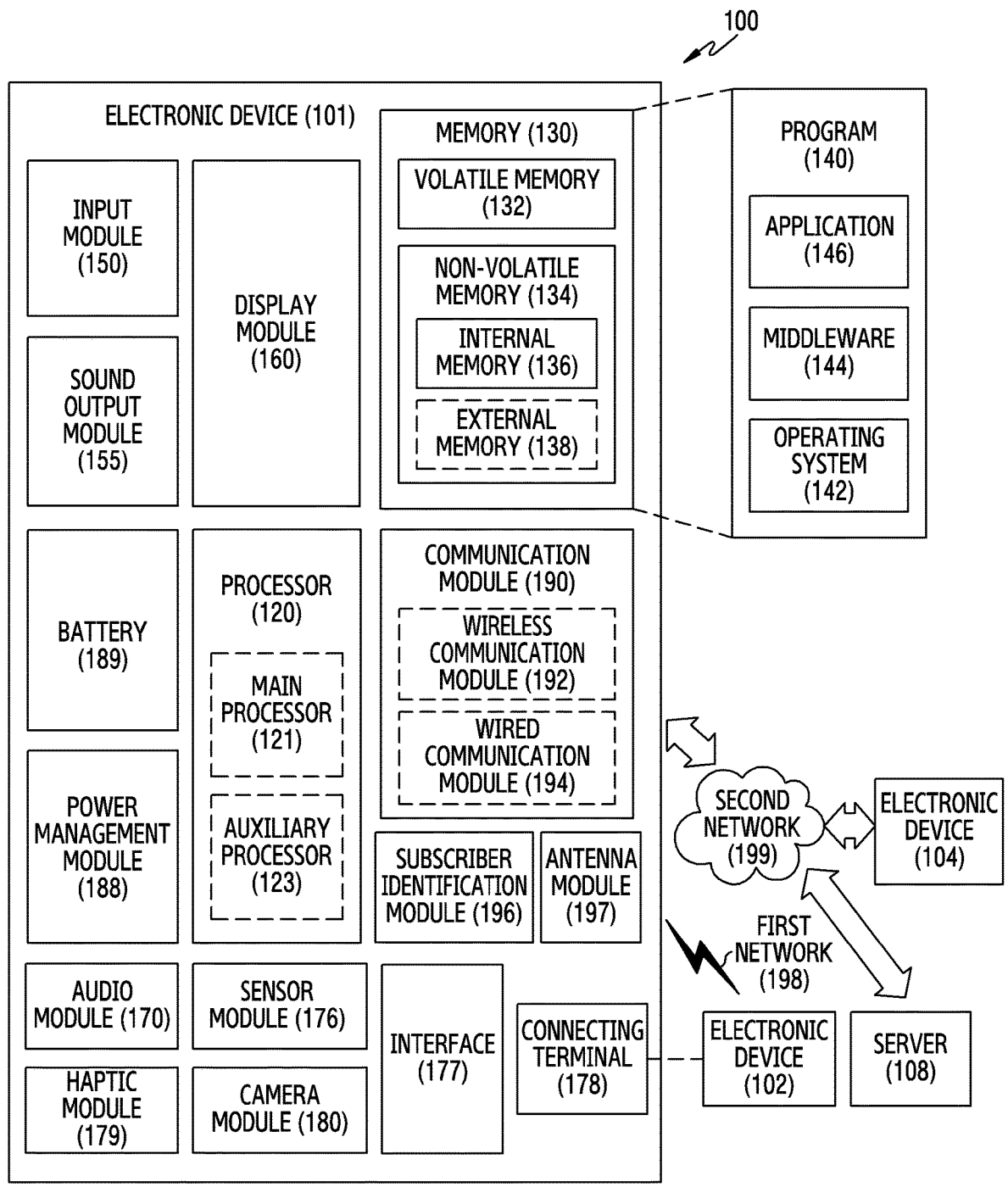
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may be in communication with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be provided in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. In operation, the auxiliary processor 123 may be adapted to consume less power than the main processor 121, or to be specific to a particular function according to another embodiment. Further, the auxiliary processor 123 may be implemented as separate from, or as part of the main processor 121.

The auxiliary processor 123 may control at least some of functions or states related to at least one component (e.g., the display device 160, the sensor module 176, or the communication module 190) of the electronic device 101 while the main processor 121 is in an inactive (e.g., sleep) state, or may control together with the main processor 121 while the main processor 121 is in an active state (e.g., executing an application). Alternatively, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for processing incoming calls. In alternate embodiment, the receiver may be implemented as separate from, or as part of the speaker.

The display device 160 may display information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. In operation, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). Here, one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
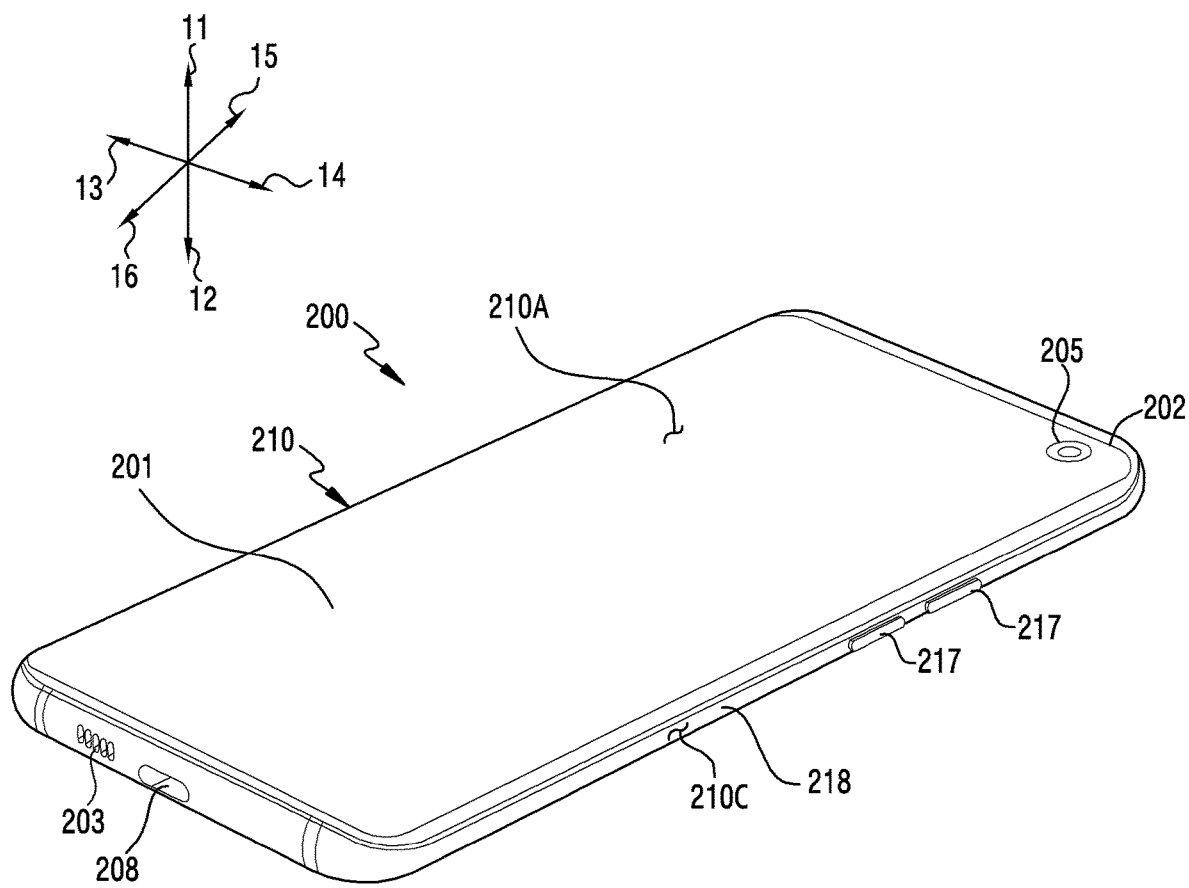
FIG. 2A is a perspective view illustrating an electronic device according to certain embodiments.
Figure 2B:
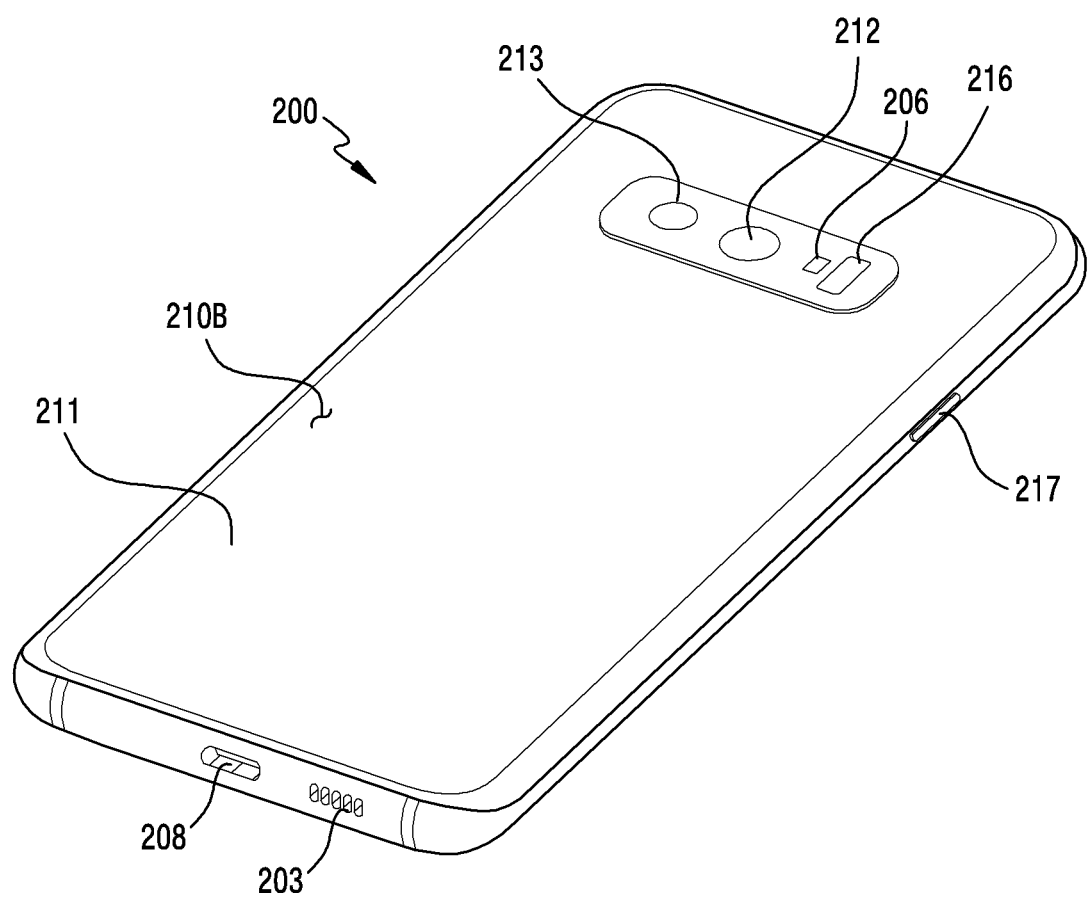
FIG. 2B is a perspective view illustrating the electronic device of FIG. 2A viewed from a rear side.

FIG. 2A is a perspective view illustrating an electronic device 200 according to certain embodiments. FIG. 2B is a perspective view illustrating the electronic device of FIG. 2A viewed from the rear side.

Referring to FIG. 2A and FIG. 2B, the electronic device 200 according to Certain embodiments may include a housing 210 including a first surface (or a front surface) 210A, a second surface (or a rear surface) 210B, and a side surface (or a side wall) 210C surrounding a space between the first surface 210A and the second surface 210B. In another embodiment (not illustrated), the term "housing" may refer to a structure forming a part of the first surface 210A, the second surface 210B, and the side surface 210C of FIG. 2A.

According to an embodiment, at least a part of the first surface 210A may be provided by a substantially transparent front plate 202 (e.g., a glass plate or a polymer plate including various coating layers). According to an embodiment, the front plate 202 may include a curved portion extending seamlessly while being curved from the first surface 201A toward a rear plate 211 in at least one side edge portion.

According to certain embodiments, the second surface 210B may be provided by a substantially opaque rear plate 211. The rear plate 211 may be made of, for example, coated or colored glass, ceramic, a polymer, or metal (e.g., aluminum, stainless steel (STS), or magnesium), or a combination of two or more of these materials. According to an embodiment, the rear plate 211 may include a curved portion extending seamlessly while being curved from the second face 210B towards the front plate 202 in at least one side edge portion.

According to certain embodiments, the side surface 210C may be provided by a side bezel structure (or "side member or side wall") 218 coupled to the front plate 202 and the rear plate 211 and including metal and/or a polymer. In some embodiments, the rear plate 211 and the side bezel structure 218 may be configured in an integral structure, and may include the same material (e.g., a metal material such as aluminum).

According to an embodiment, the electronic device 200 may include at least one of a display 201, an audio module 203, a sensor module (not illustrated), a camera module 205, a key input device 217, and a connector hole 208. In some embodiments, in the electronic device 200, at least one of the components (e.g., the key input devices 217) may be omitted, or other components may be additionally included. For example, the electronic device 200 may further include a sensor module (not illustrated). For example, in an area provided by the front plate 202, a sensor such as a proximity sensor or an illuminance sensor may be integrated with the display 201 or may be disposed at a position adjacent to the display 201.

In some embodiments, the electronic device 200 may further include a light-emitting element, and the light-emitting element may be disposed at a position adjacent to the display 201 in the area provided by the front plate 202. For example, the light-emitting element may provide, for example, the status information of the electronic device 200 in an optical form. In another example, the light-emitting element may provide a light source that is interlocked with the operation of the camera module 205. The light-emitting element may include, for example, an LED, an IR LED, and/or a xenon lamp.

For example, the display 201 may be exposed through a substantial portion of the front plate 202. In some embodiments, the edge of the display 201 may be configured to have substantially the same shape as the shape of the outline (e.g., a curved surface) of the front plate 202 adjacent thereto. In another embodiment (not illustrated), the distance between the outline of the display 201 and the outline of the front plate 202 may be substantially constant in order to enlarge the exposed area of the display 201. In another embodiment (not illustrated), the electronic device may have a recess or an opening provided in a portion of the screen display area of the display 201 and include another electronic component, such as the camera module 205, a proximity sensor (not illustrated), or an illuminance sensor (not illustrated) aligned with the recess or the opening provided.

In another embodiment (not illustrated), the rear surface of the screen display area of the display 201 may include at least one of the camera modules 212 and 213, a fingerprint sensor (216), and a flash 206. In another embodiment (not illustrated), the display 201 may be coupled to or disposed adjacent to a touch-sensitive circuit, a pressure sensor capable of measuring a touch intensity (pressure), and/or a digitizer configured to detect a magnetic-field-type stylus pen.

The audio module 203 may include a microphone hole and a speaker hole. A microphone may be disposed in the microphone hole to acquire external sound, and in some embodiments, multiple microphones may be disposed therein to detect the direction of sound. In some embodiments, the speaker hole and the microphone hole may be implemented as a single hole 203, or a speaker (e.g., a piezo speaker) may be included without a speaker hole. The speaker hole may include an external speaker hole and a call receiver hole.

The electronic device 200 may generate an electrical signal or a data value corresponding to an internal operating state or an external environmental state by including a sensor module (not illustrated). The sensor module may further include, for example, a proximity sensor disposed on the first surface 210A of the housing 210, a fingerprint sensor integrated with or disposed adjacent to the display 201, and/or a biometric sensor (e.g., an HRM sensor) disposed on the second surface 210B of the housing 210.

According to an embodiment, the electronic device 200 may further include at least one of sensor modules (not illustrated in the drawings), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212, 213, and 206 may include a first camera device 205 disposed on the first surface 210A of the electronic device 200, second camera devices 212 and 213 disposed on the second surface 210B thereof, and/or a flash 206. Each of the camera modules 205, 212, and 213 may include one or more lenses, an image sensor, and/or an image signal processor. The flash 206 may include, for example, a light-emitting diode or a xenon lamp. In some embodiments, two or more lenses (e.g., an infrared camera lens, a wide-angle lens, and a telephoto lens) and image sensors may be disposed on one face of the electronic device 200.

The key input devices 217 may be disposed on the side surface 210C of the housing 210. In another embodiment, the electronic device 200 may not include some or all of the above-mentioned key input devices 217, and a key input device 217, which is not included in the above-mentioned key input devices, may be implemented in another form, such as a soft key, on the display 201. In some embodiments, the key input devices may include at least a part of a fingerprint sensor 216 disposed on the second surface 210B of the housing 210.

The connector hole 208 may accommodate a connector configured to transmit and receive power and/or data to and from an external electronic device, and/or a connector configured to transmit and receive an audio signal to and from an external electronic device. For example, the connector hole 208 may include a USB connector or an earphone jack.

Figure 3:
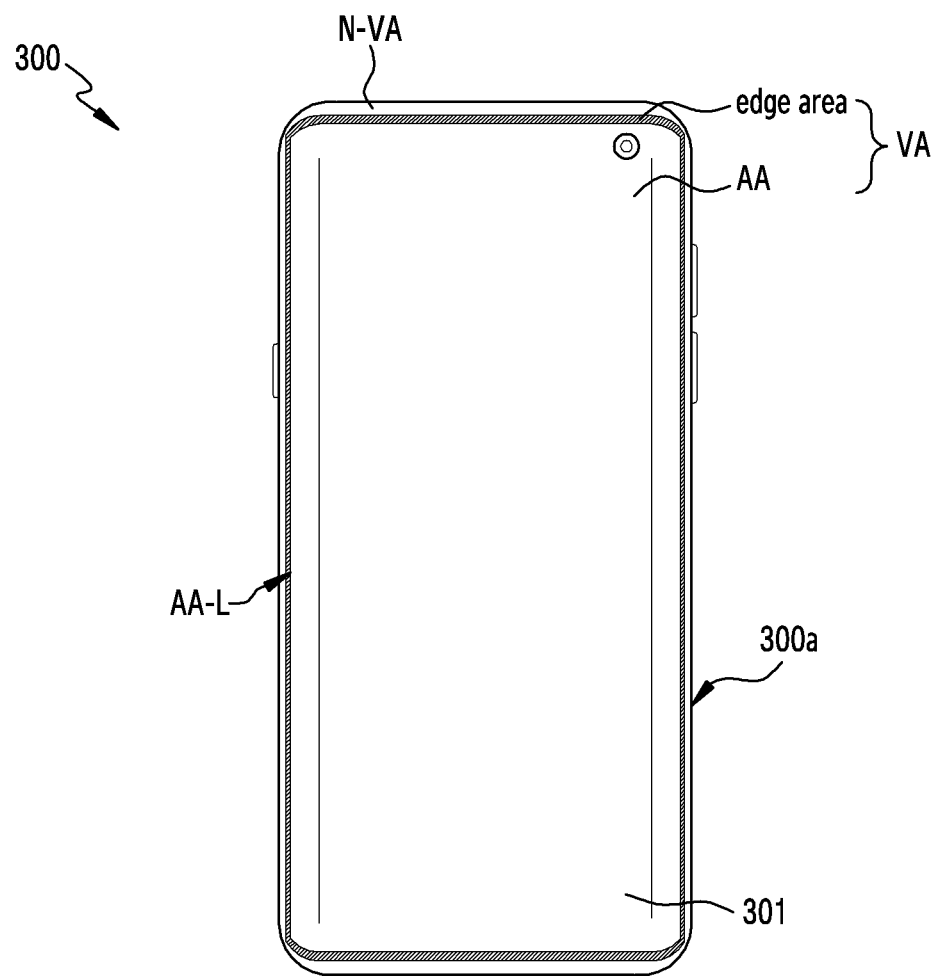
FIG. 3 is a front view illustrating a front surface of an electronic device according to certain embodiments.

FIG. 3 is a front view illustrating a front surface of an electronic device 300 according to certain embodiments.

Referring to FIG. 3, a display 301 (e.g., the display 201 in FIG. 2A) may be disposed on a front surface 300a of the electronic device 300 (e.g., the electronic device 200 in FIG. 2A). As shown, the front surface 300A of the electronic device 300 may be divided into a view area VA corresponding to the display 301 and a non-view area N-VA surrounding an outer circumferential surface of the view area VA.

According to an embodiment, the view area VA may be divided into an active area AA and an edge area provided along an outer circumferential surface AA-L of the active area AA. The active area AA may refer to an area in which the display 301 is activated and data is displayed for viewing. The edge area may refer to an area (or a "non-active area") which is positioned between the active area AA and the non-view area N-VA and in which data is not displayed, and the edge area may be viewed as a dark area (black) when viewed from the outside of the electronic device 300. According to an embodiment (not illustrated), a touch electrode pattern is disposed in an area corresponding to a partial area of the edge area and the active area AA and multiple pads may be disposed in an area corresponding to a partial area of the edge area, but the detailed description therefor will be made later.

Figure 4:
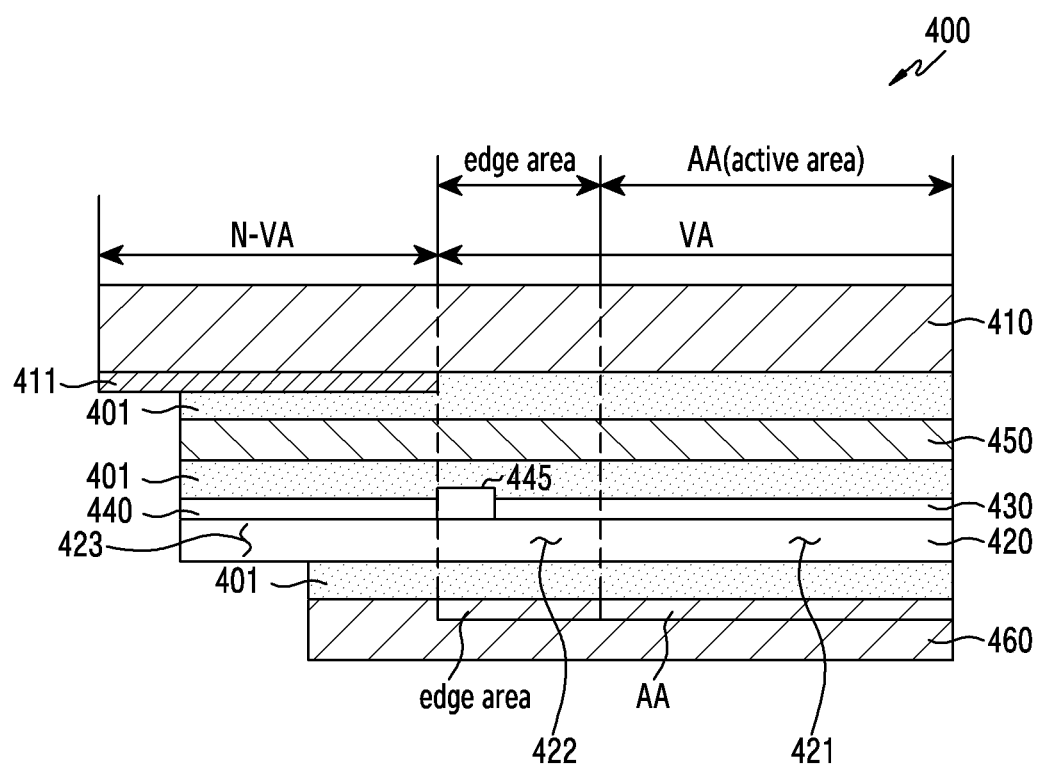
FIG. 4 is a cross-sectional view illustrating an outer edge area of an electronic device according to an embodiment.

FIG. 4 is a cross-sectional view illustrating an outer edge area of an electronic device 400 according to an embodiment.

Referring to FIG. 4, the electronic device 400 may include a window 410, a substrate 420, a touch sensing unit 430, 440, and 445, a polarizing layer 450, and/or a display panel 460. According to an embodiment, the window 410 may be disposed on the outermost side (or the uppermost end), the polarizing layer 450 and the substrate 420 on which the touch sensing unit 430, 440, and 445 is disposed may be respectively arranged under the window 410, and the display panel 460 may be disposed under the substrate 420.

According to an embodiment, the window 410 may be made of a transparent material and may include an opaque printed layer 411 disposed along an outer edge of a rear surface (or a lower end). The window 410 may be divided into a view area VA (e.g., the view area VA in FIG. 3) and a non-view area N-VA (e.g., the non-view area N-VA in FIG. 3) by the printed layer 411. For example, an inner area of the window 410, in which the printed layer 411 is not disposed on the rear surface of the window, may be divided into the view area VA, and a peripheral area of the window 410, in which the printed layer 411 is disposed on the rear surface of the window, may be divided into the non-view area N-VA. According to an embodiment, the view area VA may be configured in a rectangular shape and the non-view area N-VA may be configured in a band shape surrounding an outer edge of the view area VA.

According to an embodiment, a partial area of the display panel 460 may be viewed from the outside of the electronic device 400 through the window 410, and data or an image may be displayed in the area viewed from the outside of the electronic device 400. For example, the display panel 460 may include a thin film transistor liquid crystal display (TFT-LCD) but is not limited thereto. According to an embodiment, the display panel 460 may include an organic light emitting diode (OLED) or an active organic light-emitting diode (e.g., an active matrix organic light emitting diode (AMOLED)). According to an embodiment, an area of the display panel 460 corresponding to the view area VA may be viewed from the outside of the electronic device 400 through the window 410, but an area of the display panel 460 corresponding to the non-view area N-VA is not visible from the outside of the electronic device 400 by being covered by the printed layer 411.

The area of the display panel 460 corresponding to the view area VA may be divided into an active area AA and an edge area (or "a non-active area") according to whether a pixel is present. For example, an area in which a pixel is disposed among the area of the display panel 460 corresponding to the view area VA may be divided into the active area AA, and the active area AA may display data according to the operation of the display panel 460. In another embodiment, an area on which a pixel is not disposed may be divided into the edge area, and the edge area may be viewed as a dark area when viewed from the outside of the electronic device 400 regardless of the operation of the display panel 460. According to an embodiment, the active area AA may be configured in a rectangular shape, and the edge area may be configured in a band shape disposed along the outer circumferential surface of the active area AA.

According to an embodiment, the substrate 420 may be positioned on the display panel 460, and the substrate 420 and the display panel 460 may be integrally attached to each other by a transparent adhesive 401 (e.g., an optically clear adhesive (OCA)). The substrate 420 may include a material having rigidity (e.g., glass and plastic), a material not having elasticity, a material having elasticity to be curved, bent, or folded, or a film made of a flexible material. For example, the substrate 420 may include at least one of polycarbonate (PC), polyethylene terephthalate (PET), cyclo olefin polymer (COP), cyclo olefin copolymer (COC), polyimide (PI), a polymer compound, or olefin, but is not limited thereto. According to an embodiment (not illustrated), a color filter may be provided in an area of the substrate 420 corresponding to the display panel 460.

According to an embodiment, the polarizing layer 450 may be positioned between a rear surface (or lower end) of the window 410 and an upper end of the substrate 420 so as to obtain linearly polarized light from light output from the display panel 460. The polarized layer 450 may be integrally attached to the window 410 and/or the substrate 420 by the transparent adhesive (OCA) 401. According to an embodiment (not illustrated), the polarizing layer 450 may be coated with a coating film for reducing the reflectance or suppressing light scattering or surface reflection. For example, a coating film may include at least one of anti-reflective (AR), low-reflective (LR), anti-glare (AG), or hard coat (HC), but is not limited thereto.

According to an embodiment, a touch sensing unit configured to sense a touch by a pen or a hand of a user may be provided on the substrate 420, wherein the touch sensing unit may include a touch electrode pattern 430, a trace wire 440, and a pad 445. According to an embodiment, the touch electrode pattern 430 may be provided in an area 421 and 422 on the substrate 420 corresponding to the view area VA of the window 410, and the trace wire 440 may be provided in an area 423 of the substrate 420 corresponding to the non-view area N-VA of the window 410. The plurality of pads 445 may be disposed in the area 422 of the substrate 420 corresponding to the edge area of the view area VA. The touch electrode pattern 430 provided in the area 421 and 422 on the substrate 420 corresponding to the view area VA may be electrically connected to the trace wire 440 provided in the area 423 on the substrate 420 corresponding to the non-view area N-VA via the pad 445. In the drawings, it is illustrated that the touch sensing unit is provided on the substrate 420, but the touch sensing unit may be provided at a side surface or a lower end of the substrate 420 in some embodiments. The detailed description for each element of the touch sensing unit will be made later.

Figure 5:
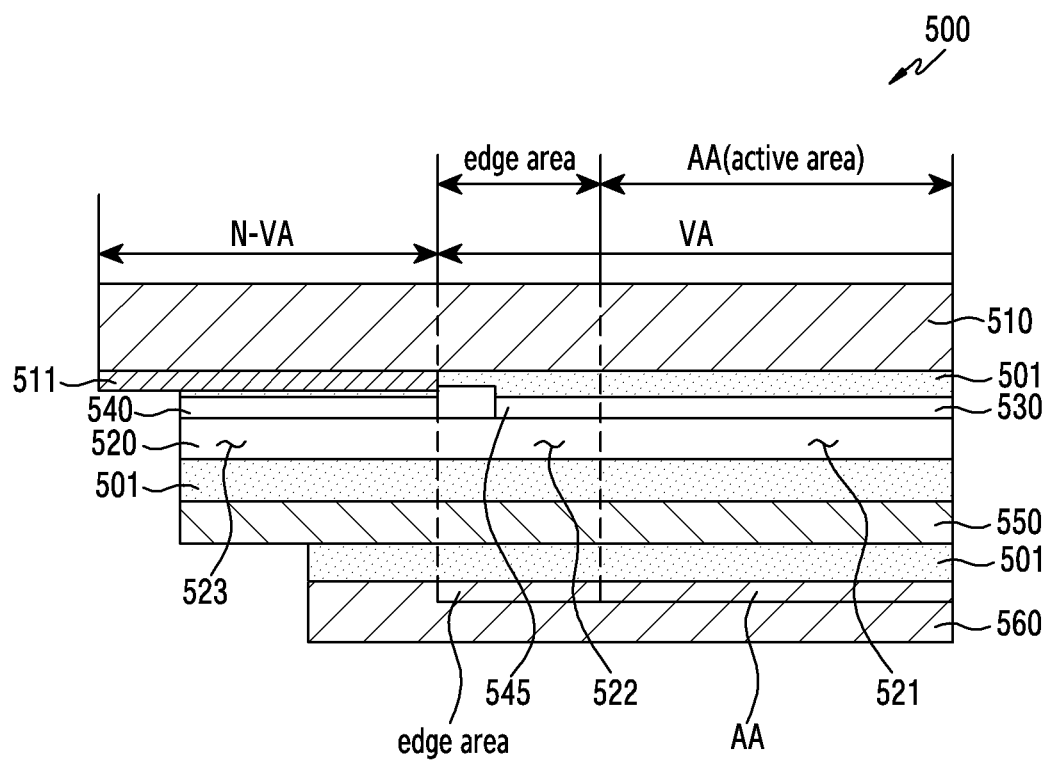
FIG. 5 is a cross-sectional view illustrating an outer edge area of an electronic device according to another embodiment.

FIG. 5 is a cross-sectional view illustrating an outer edge area of an electronic device 500 according to another embodiment.

Referring to FIG. 5, the electronic device 500 may include a window 510, a substrate 520, a touch sensing unit 530, 540, and 545, a polarizing layer 550, and/or a display panel 560. At least one of components of the electronic device 500 may be identical or similar to at least one of the components of the electronic device (e.g., the electronic device 400 in FIG. 4) in FIG. 4, and a redundant description will be omitted below for simplicity.

Unlike the electronic device (e.g., the electronic device 400 in FIG. 4) in FIG. 4, in which the substrate (e.g., the substrate 420 in FIG. 4), the polarizing layer (e.g., the polarizing layer 450 in FIG. 4), and the window (e.g., the window 410 in FIG. 4) are stacked in order based on the display panel (e.g., the display panel 460 in FIG. 4), the polarizing layer 550, the substrate 520, and the window 510 may be stacked in order based on the display panel 560 in the electronic device 500 according to another embodiment.

According to an embodiment, the substrate 520 may be positioned between the window 510 and an upper end of the polarizing layer 550, the window 510 and the substrate 520 may be integrally attached to each other by a transparent adhesive (OCA) 501, and the substrate 520 and the polarizing layer 550 may be integrally attached to each other by the transparent adhesive (OCA) 501.

The touch sensing unit configured to sense a touch of a user may be provided on the substrate 520, and the touch sensing unit may include a touch electrode pattern 530, a trace wire 540, and a pad 545. According to an embodiment, the touch electrode pattern 530 may be provided in an area 521 on the substrate 520 corresponding to the view area VA of the window 510, and the trace wire 540 may be provided in an area 523 of the substrate 520 corresponding to the non-view area N-VA of the window 510. A plurality of pads 545 may be arranged in an area 522 of the substrate 520 corresponding to the edge area of the view area VA. The touch electrode pattern 530 provided in the area 521 on the substrate 520 corresponding to the view area VA may be electrically connected to the trace wire 540 provided in the area 523 on the substrate 520 corresponding to the non-view area N-VA via the pad 545. In FIG. 5, it is illustrated that the touch sensing unit is provided on the substrate 520, but it should be obvious to those skilled in the art that the touch sensing unit can be provided at a side surface or a lower end of the substrate 520 in some embodiments.

According to an embodiment, the display panel 560 may be positioned under the polarizing layer 550, and the polarizing layer 550 may be integrally attached to the display panel 560 by a transparent adhesive 501.

Figure 6:
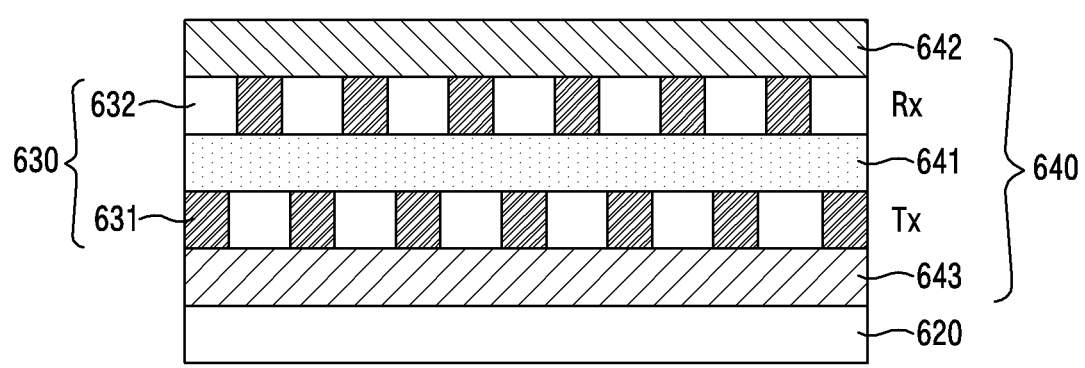
FIG. 6 is a cross-sectional view illustrating a structure of a touch electrode pattern disposed on a substrate of an electronic device according to certain embodiments.

FIG. 6 is a cross-sectional view illustrating a structure of a touch electrode pattern 630 disposed on a substrate 620 of an electronic device according to certain embodiments.

As shown, the touch electrode pattern 630 may be provided at the substrate 620 of the electronic device (e.g., the electronic device 400 in FIG. 4 or the electronic device 500 in FIG. 5). According to an embodiment, the touch electrode pattern 630 may have a low resistance value and a high conductivity, and a metal material having a flexible property may be provided to be deposited or printed on the substrate 620. For example, the touch electrode pattern 630 may be made of gold, silver, aluminum, copper, neodymium, molybdenum, nickel, or an alloy thereof, but is not limited thereto. The touch electrode pattern 630 may include a driving electrode pattern (Tx) 631 and a sensing electrode pattern (Rx) 632, and the driving electrode pattern 631 and the sensing electrode pattern 632 may include a metal mesh pattern having a lattice structure.

According to an embodiment, the driving electrode pattern 631 and the sensing electrode pattern 632 are provided on different layers so that, when a material (e.g., a hand of a user or a pen) having a capacitance comes into contact therewith, the contact position may be determined.

According to an embodiment, the electronic device may further include an insulating layer 640, and the insulating layer 640 is configured to surround the driving electrode pattern 631 and the sensing electrode pattern 632 to insulate the driving electrode pattern 631 and the sensing electrode pattern 632. For example, the insulating layer 640 may include a first insulating layer 641 positioned between the driving electrode pattern 631 and the sensing electrode pattern 632, a second insulating layer 642 positioned on the sensing electrode pattern 632, and/or a third insulating layer 643 positioned under (or at a rear surface) the driving electrode pattern 631.

In the drawings, only the embodiment in which the sensing electrode pattern 632 is positioned above the driving electrode pattern 631 is illustrated, but in some embodiments (not illustrated), it is obvious that the driving electrode pattern 631 can be positioned above the sensing electrode pattern 632.

The driving electrode pattern 631 and the sensing electrode pattern 632 may be electrically connected to a trace wire (e.g., the trace wire 440 in FIG. 4) via pads (e.g., the pad 445 in FIG. 4), respectively, and the detailed description thereof will be made later.

Figure 7:
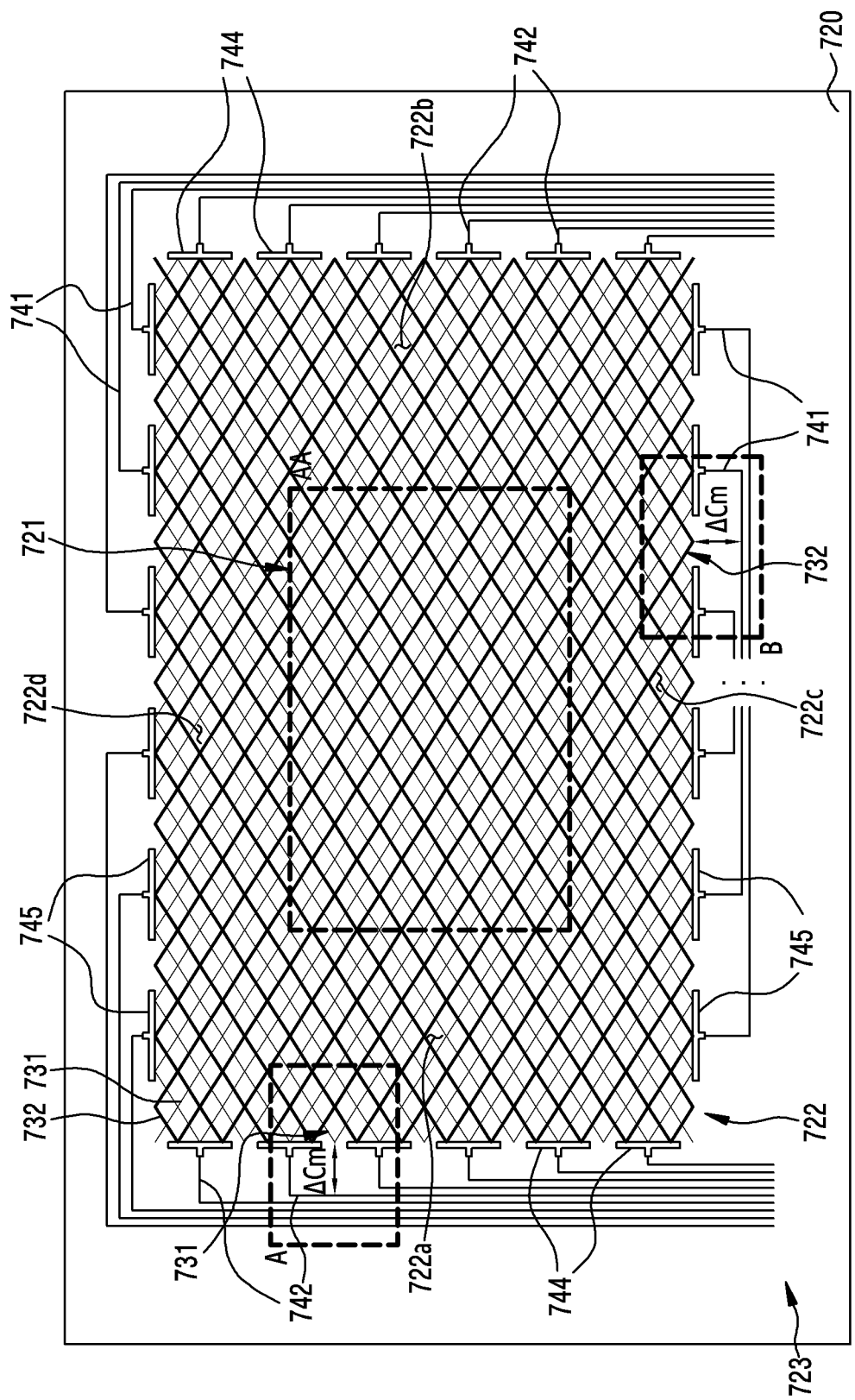
FIG. 7 is a view illustrating an electrical connection relation between a trace wire and a touch electrode pattern of an electronic device according to certain embodiments.

FIG. 7 is a view illustrating an electrical connection relation between a trace wire and a touch electrode pattern of an electronic device according to certain embodiments.

According to an embodiment, a touch electrode pattern 730 (e.g., the touch electrode pattern 430 in FIG. 4), pads 744 and 745 (e.g., the pad 445 in FIG. 4), a trace wire 740 (e.g., the trace wire 440 in FIG. 4) may be arranged on a substrate 720 (e.g., the substrate 420 in FIG. 4) of an electronic device 700 (e.g., the electronic device 400 in FIG. 4).

According to an embodiment, the touch electrode pattern 730 may be disposed at a view area VA (e.g., the view area VA in FIG. 4) of a window (e.g., the window 410 in FIG. 4), an active area (e.g., the active area in FIG. 4) of a display panel (e.g., the display panel 460 in FIG. 4), or an area 721 and 722 (e.g., 421 and 422 in FIG. 4) on the substrate 720 corresponding to an edge area (e.g., the edge area in FIG. 4). The trace wire 740 may be arranged in an area 723 (e.g., 423 in FIG. 4) on the substrate 720 corresponding to a non-view area N-VA (e.g., the non-view area N-VA in FIG. 4) of the window, and the plurality of pads 744 and 745 may be arranged in the area 722 (e.g., 422 in FIG. 4) on the substrate 720 corresponding to the edge area (e.g., the edge area in FIG. 4) of the display panel. The touch electrode pattern 730 and the trace wire 740 may be electrically connected via the plurality of pads 744 and 745.

According to an embodiment, the touch electrode pattern 730 may include a driving electrode pattern (Tx) 731 and a sensing electrode pattern (Rx) 732, and the driving electrode pattern 731 and the sensing electrode pattern 732 may be provided on separate layers. In an example, the sensing driving pattern 732 may be positioned above the driving electrode pattern 731, and in another example, the driving electrode pattern 731 may be positioned above the sensing electrode pattern 732. In some embodiments, the driving electrode pattern 731 and the sensing electrode pattern 732 may be arranged to intersect with each other when viewed from above the substrate 720.

The driving electrode pattern 731 and the sensing electrode pattern 732 may include a metal mesh pattern having a lattice structure, and in an example, the driving electrode pattern 731 and the driving electrode pattern 732 may include a metal mesh pattern having the same width, height, and/or pitch. Here, the metal mesh pattern may indicate a pattern provided in a mesh shape, and a plurality of quadrangular or rhombic lattices may be provided between the metal mesh pattern due to the structure of the mesh shape.

The area 722 on the substrate corresponding to the edge area of the display panel may include a first edge 722a provided along one side surface of the area 721 on the substrate corresponding to the active area of the display panel, a second edge 722b provided along one side surface in a direction opposite to the first edge 722a, a third edge 722c provided along one side surface in a direction perpendicular to the first edge 722a and the second edge 722b, and a fourth edge 722d provided along one side surface in a direction opposite to the third edge 722c and perpendicular to the first edge 722a and the second edge 722b. The plurality of pads 744 and 745 may be arranged at the first edge 722a, the second edge 722b, the third edge 722c, and the fourth edge 722d, respectively, to form a row.

According to an embodiment, the trace wire 740 may include a driving trace wire (Tx trace) 741 electrically connected to the driving electrode pattern 731 and a sensing trace wire (Rx trace) 742 electrically connected to the sensing electrode pattern 732. Via the electrical connection relation described above, a touch IC (not illustrated) may apply an electrical signal to the driving electrode pattern 731 or may receive an electrical signal from the sensing electrode pattern 732 so as to recognize a touch position according to an input (e.g., a pen or a hand of a user).

In an example, the sensing trace wire 742 may be disposed in an area adjacent to the first edge 722a and the second edge 722b in the area 723 on the substrate 720 corresponding to the non-view area of the window. The trace wire 732 may be electrically connected to the sensing electrode pattern 732 via the pad 744 disposed at the first edge 722a and the second edge 722b. In another example, the driving trace wire 741 may be disposed in an area adjacent to the third edge 722c and the fourth edge 722d in the area 723 on the substrate 720 corresponding to the non-view area of the window and may be electrically connected to the driving electrode pattern 732 via the pad 745 disposed at the third edge 722c and the fourth edge 722d.

According to an embodiment (area A indicated by a dotted box on upper left corner of FIG. 7), the first edge 722a and the second edge 722b are an area in which the sensing trace wire 742 and the sensing electrode pattern 732 are electrically connected to each other, but the driving electrode pattern 731 is positioned under (or above) the sensing electrode pattern 732 so that a coupling capacitance ΔCm may be provided between the sensing trace wire 742 and the driving electrode pattern 731. According to another embodiment (area B indicated by a dotted box in FIG. 7), the third edge 722c and the fourth edge 722d are also an area in which the driving trace wire 741 and the driving electrode pattern 731 are electrically connected to each other, but the sensing electrode pattern 732 is positioned above (or under) the driving electrode pattern 731 so that a coupling capacitance may be provided between the driving trace wire 741 and the sensing electrode pattern 732.

The coupling capacitance provided between the sensing trace wire 742 and the driving electrode pattern 731 or the coupling capacitance provided between the driving trace wire 741 and the sensing electrode pattern 732 may cause a malfunction (e.g., a ghost touch) of the electronic device, and thus the teachings of present disclosure provides an electronic device capable of minimizing the coupling capacitance described above to prevent a malfunction, as explained hereinafter. Note that the ghost touch may mean that a touch unintended by a user is recognized, and the ghost touch may be variously referred to as any other name.

Figure 8A:
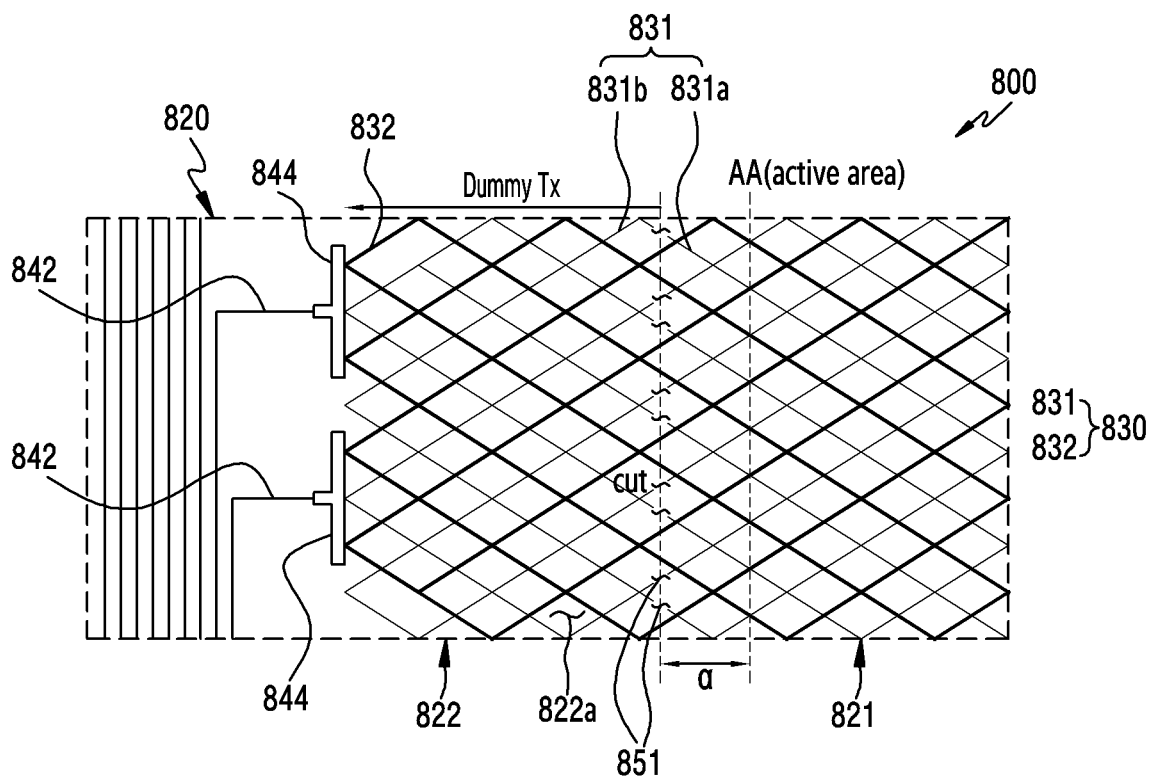
FIG. 8A is a view illustrating a disconnection part disposed in a partial area of a driving electrode pattern disposed on a substrate area corresponding to an edge area of a display panel.
Figure 8B:
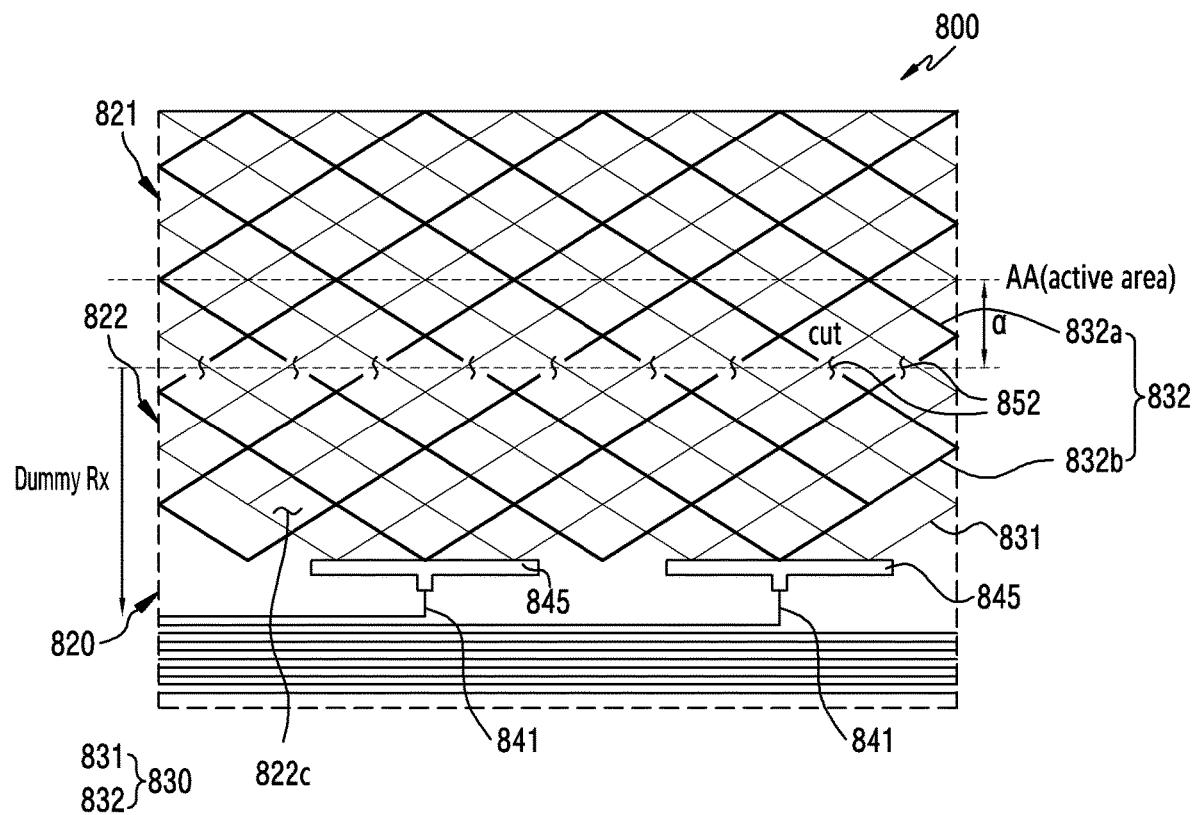
FIG. 8B is a view illustrating a disconnection part disposed in a partial area of a sensing electrode pattern disposed on a substrate area corresponding to an edge area of a display panel.

FIG. 8A is a view illustrating a disconnection part 851 disposed in a partial area of a driving electrode pattern 831 disposed on a substrate area 822a corresponding to an edge area of a display panel. FIG. 8B is a view illustrating a disconnection part 852 disposed in a partial area of a sensing electrode pattern 832 disposed on a substrate area 822c corresponding to an edge area of a display panel.

Referring to FIG. 8A and FIG. 8B, an electronic device 800 according to an embodiment may include a substrate 820, a touch electrode pattern 830 including a driving electrode pattern 831 and a sensing electrode pattern 832, a trace wire including a driving trace wire 841 and a driving trace wire 842, and/or pads 844 and 845 configured to electrically connect the touch electrode pattern 830 and the trace wire. At least one of the components of the electronic device 800 may be identical or similar to at least one of the components of the electronic device (e.g., the electronic device 700 in FIG. 7) in FIG. 7, and a redundant description will be omitted for clarity and simplicity.

According to an embodiment, a driving electrode pattern 831 and a sensing electrode pattern 832 including a metal mesh pattern may be arranged to intersect with each other in an area 821 and 822 on the substrate 820 corresponding to a view area (e.g., the view area VA in FIG. 4) of a window.

The area 821 and 822 on the substrate 820 corresponding to the view area of the window may be divided into an area 821 corresponding to an active area (the active area in FIG. 4) of a display panel (e.g., the display panel 460 in FIG. 4) and an area 822 corresponding to an edge area (the edge area in FIG. 4) of the display panel. The area 822 corresponding to the edge area of the display panel may include a first edge 822a provided along one side surface of the area 821 corresponding to the active area of the display panel, a second edge (e.g., the second edge 722b in FIG. 7) provided along one side surface in a direction opposite to the first edge 822a, a third edge 822c provided along one side surface in a direction perpendicular to the first edge 822a and the second edge, and a fourth edge (e.g., the fourth edge 722d in FIG. 7) provided along one side surface in a direction opposite to the third edge 822c.

Referring to FIG. 8A, according to an embodiment, the plurality of pads 844 may be arranged to form a row at the first edge 822a. The sensing trace wire 842 arranged in the area 823 on the substrate 820 corresponding to a non-view area (e.g., the non-view area N-VA in FIG. 4) of the window may be electrically connected to the sensing electrode pattern 832 via the plurality of pads 844 arranged at the first edge 822a.

According to an embodiment, the disconnection part 851 configured to disconnect a connection line of the driving electrode pattern 831 may be provided at a partial area of the first edge 822a. The disconnection part 851 may disconnect the driving electrode pattern 831 arranged at a partial area of the first edge 822a so as to divide the driving electrode pattern 831 into a driving area 831a and a dummy area 831b. That is, the electronic device 800 may minimize a coupling capacitance (e.g., the coupling capacitance ΔCm in FIG. 7) unintentionally incurred between the sensing trace wire 842 and the driving electrode pattern 831 disposed under (or above) the sensing electrode pattern 832 via the disconnection part 851. Although not illustrated in the drawings, the disconnection part 851 may be also provided at a partial area of the second edge to minimize the coupling capacitance between the sensing trace wire 842 and the driving electrode pattern 831, which may occur at the second edge.

According to an embodiment, the disconnection part 851 may be provided to be spaced a predetermined distance α apart from an outer circumferential surface of the area 821 corresponding to the active area of the display panel. When the disconnection part 851 is provided at a position closer than the predetermined distance α with respect to the outer circumferential surface of the area 821 corresponding to the active area of the display panel, a problem of not being able to sense the touch input to the edge area of the area 821 corresponding to the active area AA of the display panel may occur. In contrast, when the disconnection part 851 is provided at a position farther than the predetermined distance α, the coupling capacitance incurred between the sensing trace wire 842 and the driving electrode pattern 831 cannot be prevented, and thus the disconnection part 851 is preferably provided to space the predetermined distance α apart from the outer circumferential surface of the area 821 corresponding to the active area of the display panel. In an example, the disconnection part 851 may be provided in an area spaced 300 μm apart from the outer circumferential surface of the area 821 corresponding to the active area of the display panel, but is not limited thereto.

Referring to FIG. 8B, the plurality of pads 845 may be also arranged to form a row at the third edge 822c, and the driving trace wire 841 disposed in the area 823 on the substrate 820 corresponding to the non-view area (e.g., the non-view area N-VA in FIG. 4) of the window may be electrically connected to the driving electrode pattern 831 via the plurality of pads 845 at the third edge 822c. Since, at the third edge 822c area, the coupling capacitance may unintentionally occur between the driving trace wire 841 and the sensing electrode pattern 832 disposed above (or under) the driving electrode pattern 831, the disconnection part 852 configured to disconnect the connection line of the sensing electrode pattern 832 may be provided at a partial area of the third edge 822c. The disconnection part 852 may disconnect the sensing electrode pattern 832 disposed at a partial area of the third edge 822c so as to divide the sensing electrode pattern 832 into a driving area 832a and a dummy area 832b, and as a result, the coupling capacitance (e.g., the coupling capacitance ΔCm in FIG. 7) incurred between the driving trace wire 841 and the sensing electrode pattern 832 may be minimized. Although not illustrated in the drawings, the disconnection part 852 may be also provided at a partial area of the fourth edge so as to minimize the coupling capacitance between the driving trace wire 841 and the sensing electrode pattern 832, which may occur at the fourth edge. According to an embodiment, the disconnection part 852 may be provided to be spaced a predetermined distance a apart from an outer circumferential surface of the area 821 corresponding to the active area of the display panel, and a redundant description will be omitted.

That is, the electronic device 800 according to an embodiment may minimize the coupling capacitance incurred between the driving electrode pattern 831 and the sensing trace wire 842 or between the sensing electrode pattern 832 and the driving trace wire 841 via the disconnection part 851 provided at at least a partial area of the driving electrode pattern 831 disposed at the first edge 822a and/or the second edge and the disconnection part 852 provided at at least a partial area of the sensing electrode pattern 832 disposed at the third edge 822c and/or the fourth edge.

Figure 9A:
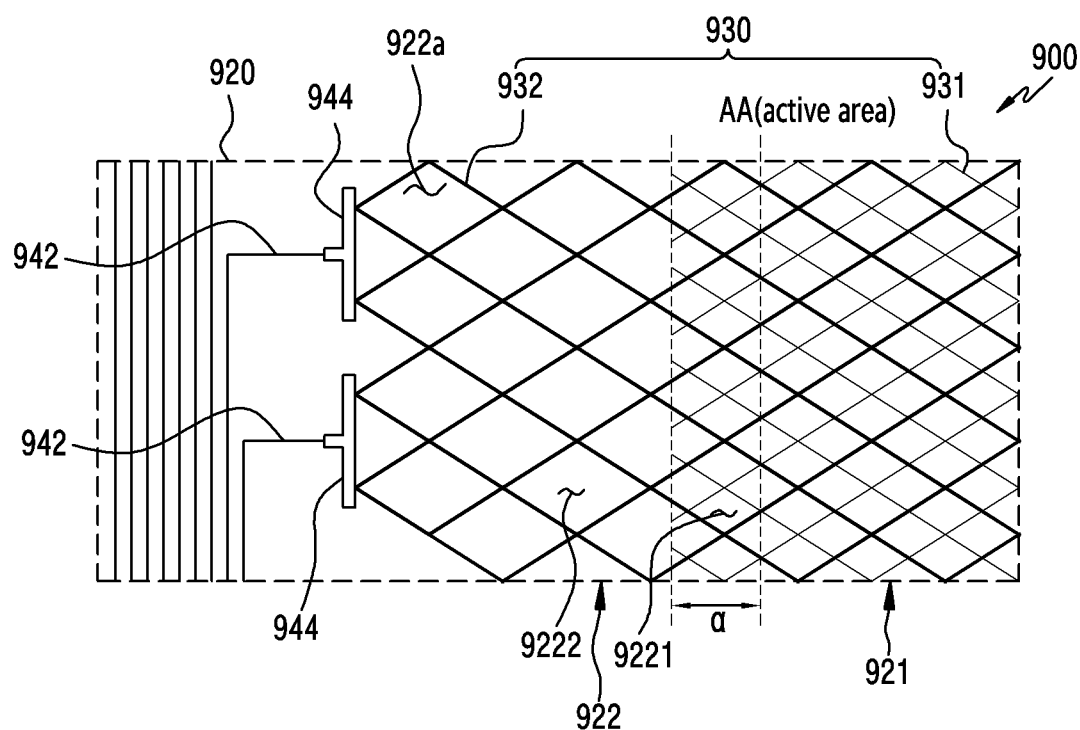
FIG. 9A is a view illustrating a state in which only a sensing electrode pattern is disposed in a partial area of a substrate area corresponding to an edge area of a display panel.
Figure 9B:
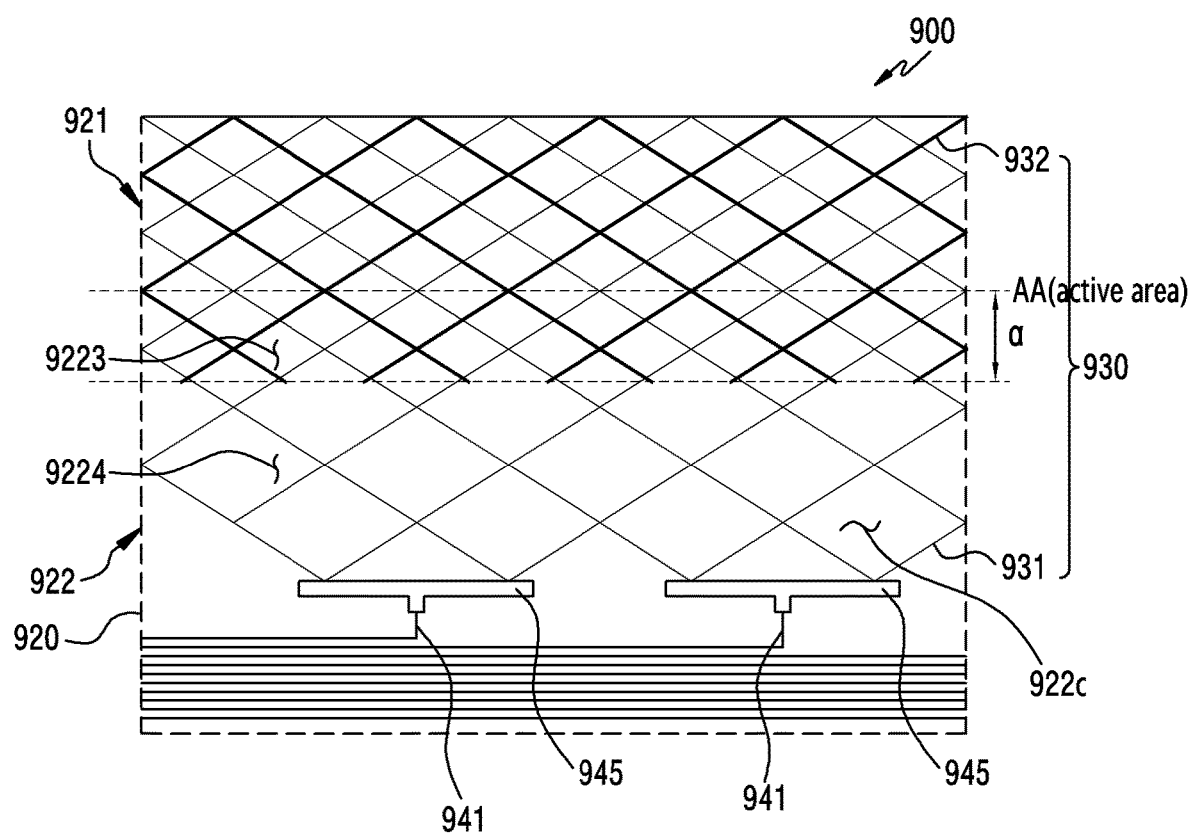
FIG. 9B is a view illustrating a state in which only a driving electrode pattern is disposed in a partial area of a substrate area corresponding to an edge area of a display panel.

FIG. 9A is a view illustrating a state in which only a sensing electrode pattern 932 is disposed in a partial area of a substrate area 922a corresponding to an edge area of a display panel. FIG. 9B is a view illustrating a state in which only a driving electrode pattern 931 is disposed in a partial area 922c of a substrate area corresponding to an edge area of a display panel.

Referring to FIG. 9A and FIG. 9B, an electronic device 900 according to another embodiment may include a substrate 920, a touch electrode pattern 930 including a driving electrode pattern 931 and a sensing electrode pattern 932, a trace wire including a driving trace wire 941 and a sensing trace wire 942, and/or pads 944 and 945 configured to electrically connect the trace wire and the touch electrode pattern 930. At least one of the components of the electronic device 900 may be identical or similar to at least one of the components of the electronic device (e.g., the electronic device 700 in FIG. 7) in FIG. 7 and the electronic device (e.g., the electronic device 800 in FIG. 8A and FIG. 8B) in FIG. 8A or FIG. 8B, a redundant description will be omitted.

According to an embodiment, the sensing electrode pattern 932 and the driving electrode pattern 931 including a metal mesh pattern may be provided in an area 921 and 922 on the substrate 920 corresponding to a view area (e.g., the view area VA in FIG. 4) of a window. The driving electrode pattern 931 and the sensing electrode pattern 932 may be provided on separate layers, and the driving electrode pattern 931 and the sensing electrode pattern 932 may be arranged to intersect with each other when viewed from above the substrate 920.

The area 921 and 922 on the substrate 920 corresponding to the view area of the window may be divided into an area 921 corresponding to an active area (the active area in FIG. 4) of a display panel (e.g., the display panel 460 in FIG. 4) and an area 922 corresponding to an edge area (the edge area in FIG. 4) of the display panel. The area 922 corresponding to the edge area of the display panel may include a first edge 922a provided along one side surface of the area 921 corresponding to the active area of the display panel, a second edge (e.g., the second edge 722b in FIG. 7) provided along one side surface in a direction opposite to the first edge 922a, a third edge 922c provided along one side surface in a direction perpendicular to the first edge 922a and the second edge, and a fourth edge (e.g., the fourth edge 722d in FIG. 7) provided along one side surface in a direction opposite to the third edge 922c.

Referring to FIG. 9A, the plurality of pads 944 may be arranged to form a row at the first edge 922a. The sensing trace wire 942 arranged in the area 923 on the substrate 920 corresponding to a non-view area (e.g., the non-view area N-VA in FIG. 4) of the window may be electrically connected to the sensing electrode pattern 932 via the plurality of pads 944 arranged at the first edge 922a. At the first edge 922a, an unintended coupling capacitance (e.g., the coupling capacitance ΔCm in FIG. 7) may occur between the sensing trace wire 942 and the driving electrode pattern 931 positioned under (or above) the sensing electrode pattern 932. The coupling capacitance incurred between the sensing trace wire 942 and the driving electrode pattern 931 may cause a malfunction such as a ghost touch.

The electronic device 900 according to an embodiment may arrange only the sensing electrode pattern 932 at a partial area of the first edge 922a without the driving electrode pattern 931 so as to minimize the coupling capacitance incurred between the sensing trace wire 942 and the driving electrode pattern 931. According to an embodiment, the first edge 922a may be divided into an area in which both the driving electrode pattern 931 and the sensing electrode pattern 932 are arranged and an area in which only the sensing electrode pattern 932 is arranged without the driving electrode pattern 931. For example, both the driving electrode pattern 931 and the sensing electrode pattern 932 may be arranged in an area 9221 of the first edge 922a positioned within a predetermined distance α from an outer circumferential surface of the area 921 corresponding to the active area of the display panel. In another example, only the sensing electrode pattern 932 may be arranged, without the driving electrode pattern 931, in an area 9222 distanced, by a predetermined distance a or more, from the outer circumferential surface of the area 921 corresponding to the active area of the display panel in the area of the first edge 922a.

When only the sensing electrode pattern 932 is also disposed in the area 9221 positioned within the predetermined distance α from the outer circumferential surface of the area 921 corresponding to the active area of the display panel, a problem of not being able to sense the touch input to the edge area of the area 921 corresponding to the active area AA of the display panel may occur. In contrast, when both the driving electrode pattern 931 and the sensing electrode pattern 932 are arranged in the area 9222 distanced, by the predetermined distance a or more, from the outer circumferential surface of the area 921 corresponding to the active area of the display panel, there is a problem of not being able to prevent the coupling capacitance incurred between the sensing trace wire 942 and the driving electrode pattern 931. Accordingly, in the first edge 922a, only the sensing electrode pattern 932 is preferably disposed in the area 9222 distanced, by the predetermined distance α or more, from the outer circumferential surface of the area 921 corresponding to the active area of the display panel, and both the driving electrode pattern 931 and the sensing electrode pattern 932 is preferably disposed in the area 9221 positioned within the predetermined distance α. In an example, the predetermined distance α may be 300 μm, but is not limited thereto. Although not illustrated in the drawings, also at the second edge, both the driving electrode pattern 931 and the sensing electrode pattern 932 may be arranged in the area 9221 positioned within the predetermined distance a from the outer circumferential surface of the area 921 corresponding to the active area of the display panel, and only the sensing electrode pattern 932 may be disposed in the area 9222 distanced by the determined distance α or more therefrom, thereby minimizing the coupling capacitance incurred between the sensing trace wire 942 and the driving electrode pattern 931.

Referring to FIG. 9B, the plurality of pads 945 may be also arranged to form a row at the third edge 922c. The driving trace wire 941 disposed in the area 923 on the substrate 920 corresponding to a non-view area (e.g., the non-view area N-VA in FIG. 4) of the window may be electrically connected to the driving electrode pattern 931 via the plurality of pads 945 arranged at the third edge 922c. Also, at the third edge 922c, the unintended coupling capacitance (e.g., the coupling capacitance ΔCm in FIG. 7) may occur between the driving trace wire 941 and the sensing electrode pattern 932 positioned above (or under) the driving electrode pattern 931. The coupling capacitance incurred between the driving trace wire 941 and the sensing electrode pattern 932 may cause a malfunction such as a ghost touch.

In the electronic device 900 according to an embodiment, only the sensing electrode pattern 932 may be disposed at a partial area of the third edge 922c without the driving electrode pattern 931 so as to minimize the coupling capacitance incurred between the driving trace wire 941 and the sensing electrode pattern 932. The third edge 922c may be divided into an area in which both the driving electrode pattern 931 and the sensing electrode pattern 932 are arranged and an area in which only the driving electrode pattern 931 is disposed without the sensing electrode pattern 932. In an example, both the driving electrode pattern 931 and the sensing electrode pattern 932 may be arranged in an area 9223 of the third edge 922c positioned within a predetermined distance α from the outer circumferential surface of the area 921 corresponding to the active area of the display panel. In another example, only the driving electrode pattern 931 may be disposed, without the sensing electrode pattern 932, in an area 9224 distanced, by the predetermined distance α or more, from the outer circumferential surface of the area 921 corresponding to the active area of the display panel in an area of the third edge 922c, and a redundant description will be omitted. Although not illustrated in the drawings, also at the fourth edge, both the driving electrode pattern 931 and the sensing electrode pattern 932 may be arranged in the area 9223 positioned within a predetermined distance a from the outer circumferential surface of the area 921 corresponding to the active area of the display panel, and only the driving electrode pattern 931 may be disposed in the area 9224 distanced by the predetermined distance α therefrom, thereby minimizing the coupling capacitance incurred between the driving trace wire 941 and the sensing electrode pattern 932.

That is, in the electronic device 900 according to an embodiment, only the driving electrode pattern 931 may be disposed, without the sensing electrode pattern 932, in an area (e.g., a partial area of the first edge 922a and the second edge) adjacent to the driving trace wire 941, and only the sensing electrode pattern 932 may be disposed, without the driving electrode pattern 931, in an area (e.g., the third edge 922c and the fourth edge) adjacent to the sensing trace wire 942, thereby preventing a malfunction such as a ghost touch from occurring.

Figure 10A:
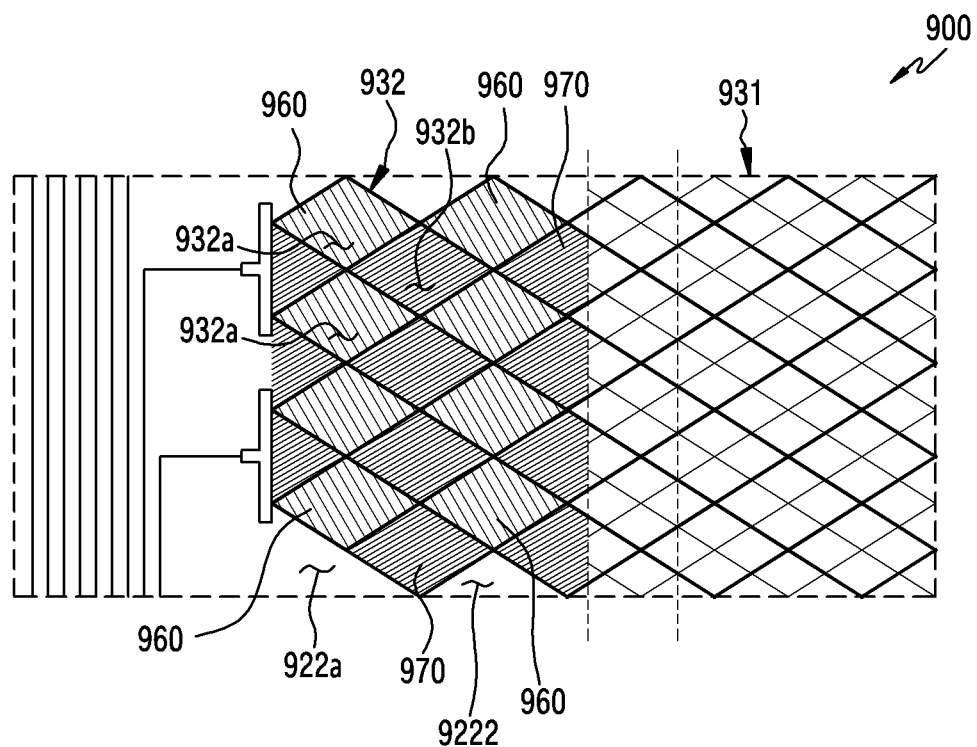
FIG. 10A is a view illustrating a metal pattern and a dummy pattern arranged in a lattice configured by a sensing electrode pattern.
Figure 10B:
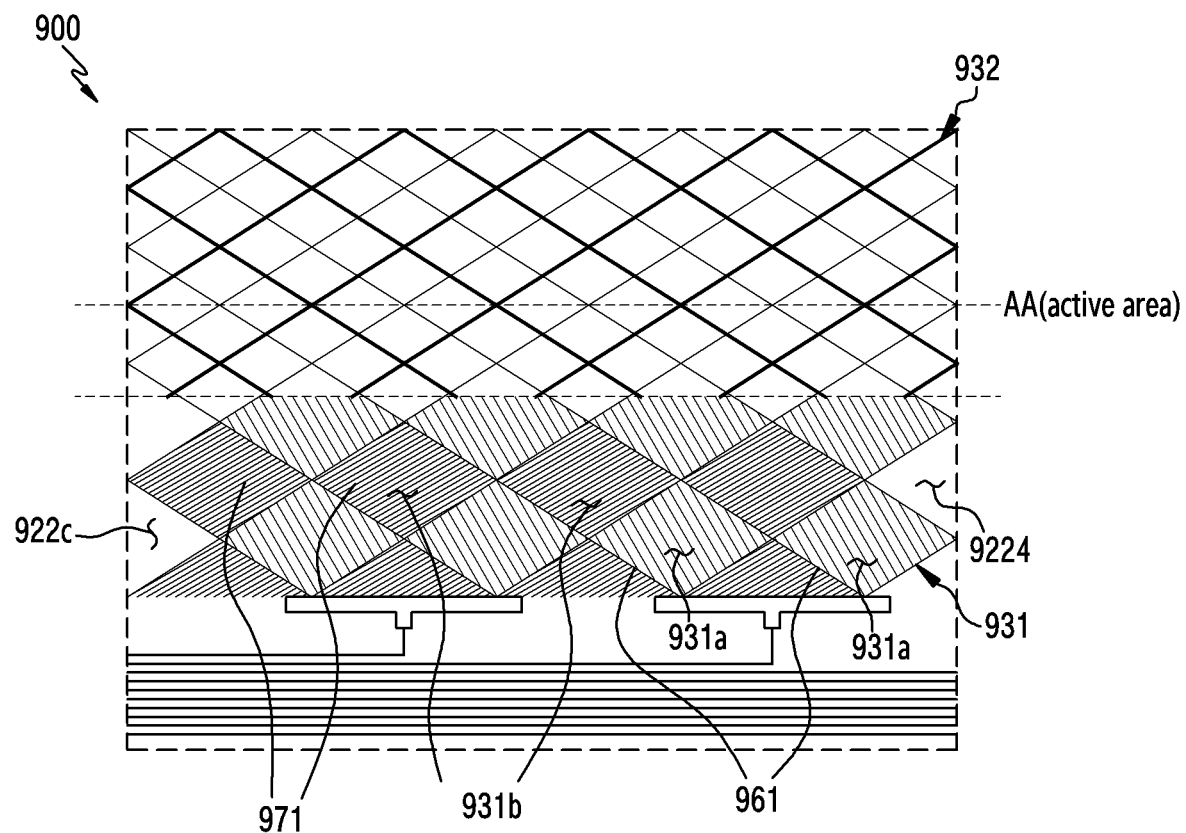
FIG. 10B is a view illustrating a metal pattern and a dummy pattern arranged in a lattice configured by a driving electrode pattern.

FIG. 10A is a view illustrating a metal pattern 960 and a dummy pattern 970 arranged in a lattice configured by a sensing electrode pattern 931. FIG. 10B is a view illustrating a metal pattern 961 and a dummy pattern 971 arranged in a lattice configured by a driving electrode pattern 932.

Referring to FIG. 10A, the electronic device 900 according to an embodiment may further include the metal pattern 960 and the dummy pattern 970. As shown, only the sensing electrode pattern 932 may be disposed, without the driving electrode pattern 931, at the partial area 9222 of the first edge 922a of the electronic device 900 according to an embodiment, and the metal pattern 960 and the dummy pattern 970 may be provided on the partial area 9222 of the first edge 922a, in which only the sensing electrode pattern 932 is disposed. The sensing electrode pattern 932 may include a metal mesh pattern having a lattice structure, and a plurality of quadrangular or rhombic lattices may be provided by the sensing electrode pattern 932. The plurality of lattices provided by the sensing electrode pattern 932 may be divided into a lattice 932a provided in the sensing electrode pattern 932 electrically connected to the sensing trace wire 942 and a lattice 932b provided between the plurality of sensing electrode patterns 932.

According to an embodiment, the metal pattern 960 may be disposed between the lattices 932a provided in the sensing electrode pattern 932, and the dummy pattern 970 may be disposed at the lattice 932b provided between the plurality of sensing electrode patterns 932. In an example, the metal pattern 960 and the dummy pattern 970 may be made of a metal material identical to that of the sensing electrode pattern 932, but in some embodiments, the metal pattern 960 and the dummy pattern 970 may be made of a metal material different from that of the sensing electrode pattern 932.

In an example, the metal pattern 960 and the dummy pattern 970 may be configured in a shape of filling an inner space of the lattices 932a and 932b. The metal pattern 960 may be disposed between the lattices 932a provided in the sensing electrode pattern 932 so as to reduce a resistance value of the sensing electrode pattern 932. As the resistance value of the sensing electrode pattern 932 is reduced, the touch recognition performance of the touch electrode pattern may be improved, and as a result, the electronic device 900 may accurately recognize a hovering touch input (e.g., a gesture of a user).

In another example, the metal pattern 960 may fill an inner space of the lattice 932a provided in the sensing electrode pattern 932, and the dummy pattern 970 may fill an inner space of the lattice 932b provided between the plurality of sensing electrode patterns 932, thereby preventing the sensing electrode pattern 932 from being viewed from the outside of the electronic device 900. Although not illustrated in the drawings, it is obvious that the metal pattern 960 and the dummy pattern 970 can be arranged in an area of the second edge, in which only the sensing electrode pattern 932 is disposed.

Referring to FIG. 10B, as illustrated in FIG. 9B, only the driving electrode pattern 931 may be disposed, without the sensing electrode pattern 932, at the partial area 9224 of the third edge 922c. The driving electrode pattern 931 may include a metal mesh pattern having a lattice structure so that a plurality of quadrangular or rhombic lattices may be provided at the partial area 9224 of the third edge 922c. The plurality of lattices provided by the driving electrode pattern 931 may be divided into a lattice 931a provided in the driving electrode pattern 931 electrically connected to the driving trace wire 941 and a lattice 931b provided between the plurality of driving electrode patterns 931, and the metal pattern 961 and the dummy pattern 971 may be arranged in the plurality of lattices 931a and 931b. In an example, the metal pattern 961 and the dummy pattern 971 may be made of a metal material identical to that of the driving electrode pattern 931, but is not limited thereto.

The metal pattern 961 may be disposed between the lattices 931a provided in the driving electrode pattern 931 to reduce the resistance value of the driving electrode pattern 931, and as a result, the touch recognition performance of the driving electrode pattern 931 may be improved (e.g., a hovering touch input recognition and the like). According to an embodiment, the metal pattern 961 and the dummy pattern 971 may be configured in a shape of filling the inner space of the lattices 931a and 931b. The metal pattern 961 and the dummy pattern 971 may be arranged to fill the inner space of the lattices 931a and 931b so as to prevent the driving electrode pattern 931 disposed on the area 922 on the substrate 920 corresponding to the edge area of the display from being viewed from the outside of the electronic device 900. Although not illustrated in the drawings, also in an area of the fourth edge in which only the driving electrode pattern 931 is provided, it is obvious that the metal pattern 961 and the dummy pattern 971 can be arranged between the lattices provided by the driving electrode pattern 931.

According to certain embodiments of the disclosure, an electronic device (e.g., the electronic device 400 in FIG. 4) may include a display panel (e.g., the display panel 460 in FIG. 4) including an active area in which data is displayed and an edge area which is disposed along an outer circumferential surface of the active area, a substrate (e.g., the substrate 420 in FIG. 4) which is positioned on the display panel and includes a first area (e.g., 421 in FIG. 4) corresponding to the active area and a second area (e.g., 422 in FIG. 4) corresponding to the edge area, a metal mesh electrode pattern (e.g., the touch electrode pattern 430 in FIG. 4) which is disposed on the first area and the second area, and a plurality of trace wires (e.g., the trace wire 440 in FIG. 4) which are electrically connected to the metal mesh electrode pattern, wherein the metal mesh electrode pattern includes a first electrode pattern (e.g., the driving electrode pattern 631 in FIG. 6) which has a lattice structure and a second electrode pattern (e.g., the sensing electrode pattern 632 in FIG. 6) which is positioned above the first electrode pattern and has a lattice structure, the first and second electrode patterns being disposed to intersect with each other, and a disconnection part (e.g., the disconnection part 851 and 852 in FIG. 8A and FIG. 8B) may be disposed at at least a partial area of the metal mesh electrode pattern disposed on the second area.

According to an embodiment, the disconnection part may be disposed at the position spaced a predetermined distance (e.g., a in FIG. 8A and FIG. 8B) apart from an outer circumferential surface of the first area.

According to an embodiment, the second area (e.g., 722 in FIG. 7) may include a first edge (e.g., the first edge 722a in FIG. 7) provided along one side surface of the first area, a second edge (e.g., the second edge 722b in FIG. 7) provided in a direction opposite to the first edge, a third edge (e.g., the third edge 722c in FIG. 7) provided in a direction perpendicular to the first edge and the second edge, and a fourth edge (e.g., the fourth edge 722d in FIG. 7) provided in a direction opposite to the third edge.

According to an embodiment, the disconnection part (e.g., the disconnection part 851 in FIG. 8A) may be provided at at least a partial area of the first electrode pattern provided on the first edge or the second edge to disconnect the first electrode pattern.

According to an embodiment, the disconnection part (e.g., the disconnection part 852 in FIG. 8B) may be provided at at least a partial area of the second electrode pattern provided on the third edge or the fourth edge to disconnect the second electrode pattern.

According to an embodiment, a polarizing layer (e.g., the polarizing layer 450 in FIG. 4) positioned above the metal mesh electrode pattern may be further included.

According to an embodiment, a polarizing layer (e.g., the polarizing layer 550 in FIG. 5) positioned between the substrate and the display panel may be further included.

According to an embodiment, a first insulating layer (e.g., the first insulating layer 641 in FIG. 6) positioned between the first electrode pattern and the second electrode pattern may be further included According to an embodiment, a second insulating layer (e.g., the second insulating layer 642 in FIG. 6) positioned above the second electrode pattern and a third insulating layer (e.g., the third insulating layer 643 in FIG. 6) positioned between the first electrode pattern and the substrate may be further included.

According to certain embodiments of the disclosure, an electronic device (e.g., the electronic device 400 in FIG. 4) may include a display panel (e.g., the display panel 460 in FIG. 4) including an active area in which data is displayed and an edge area which is disposed along an outer circumferential surface of the active area, a substrate (e.g., the substrate 420 in FIG. 4) which is positioned on the display panel and includes a first area (e.g., 421 in FIG. 4) corresponding to the active area and a second area (e.g., 422 in FIG. 4) corresponding to the edge area, a metal mesh electrode pattern (e.g., the touch electrode pattern 430 in FIG. 4) which is disposed on the first area and the second area, and a plurality of trace wires (e.g., the trace wire 440 in FIG. 4) positioned on the substrate and electrically connected to the metal mesh electrode pattern, wherein the metal mesh electrode pattern includes a first electrode pattern (e.g., the driving electrode pattern 631 in FIG. 6) which has a lattice structure and a second electrode pattern (e.g., the sensing electrode pattern 632 in FIG. 6) which is positioned above the first electrode pattern and has a lattice structure, the first and second electrode patterns being disposed to intersect with each other, the first electrode pattern and the second electrode pattern are provided at the first area, and only one of the first electrode pattern and the second electrode pattern is provided at at least a partial area (e.g., 9222 in FIG. 9A and 9224 in FIG. 9B) of the second area.

According to an embodiment, the first electrode pattern and the second electrode pattern may be provided in an area (e.g., 9221 in FIG. 9A and 9223 in FIG. 9B) of the second area positioned within a predetermined distance from an outer circumferential surface of the first area, and only one of the first electrode pattern and the second electrode pattern may be provided in an area (e.g., 9222 in FIG. 9A and 9224 in FIG. 9B) of the second area distanced, by a predetermined distance or more, from the outer circumferential surface of the first area.

According to an embodiment, the second area (e.g., 722 in FIG. 7) may include a first edge (e.g., the first edge 722a in FIG. 7) provided along one side surface of the first area, a second edge (e.g., the second edge 722b in FIG. 7) provided in a direction opposite to the first edge, a third edge (e.g., the third edge 722c in FIG. 7) provided in a direction perpendicular to the first edge and the second edge, and a fourth edge (e.g., the fourth edge 722d in FIG. 7) provided in a direction opposite to the third edge.

According to an embodiment, only the first electrode pattern (e.g., the sensing electrode pattern 932 in FIG. 9A) may be provided at at least a partial area (e.g., 9222 in FIG. 9a) of the first edge or the second edge.

According to an embodiment, a first metal pattern (e.g., the metal pattern 960) in FIG. 10A) and a first dummy pattern (e.g., the dummy pattern 970 in FIG. 10A) positioned on an area in which only the first electrode pattern of the substrate is disposed may be further included, wherein the first metal pattern and the first dummy pattern are arranged between lattices (e.g., 932a and 932b in FIG. 10A) configured by the first electrode pattern.

According to an embodiment, only the second electrode pattern (e.g., the driving electrode pattern 931 in FIG. 9B) may be provided at at least a partial area (e.g., 9224 in FIG. 9B) of the third edge or the fourth edge.

According to an embodiment, a second metal pattern (e.g., the metal pattern 951 in FIG. 10B) and a second dummy pattern (e.g., the dummy pattern 971 in FIG. 10B) positioned on an area in which only the second electrode pattern of the substrate is disposed may be further included, and the second metal pattern and the second dummy pattern may be arranged between the lattices (e.g., 931a and 931b in FIG. 10B) provided by the second electrode pattern.

According to an embodiment, a polarizing layer (e.g., the polarizing layer 450 in FIG. 4) positioned above the metal mesh electrode pattern may be further included.

According to an embodiment, a polarizing layer (e.g., the polarizing layer 550 in FIG. 5) positioned between the substrate and the display panel may be further included.

According to an embodiment, a first insulating layer (e.g., the first insulating layer 641 in FIG. 6) positioned between the first electrode pattern and the second electrode pattern may be further included.

According to an embodiment, a second insulating layer (e.g., the second insulating layer 642 in FIG. 6) positioned above the second electrode pattern and a third insulating layer (e.g., the third insulating layer 643 in FIG. 6) positioned between the first electrode pattern and the substrate may be further included.

In specific embodiments of the disclosure described above, a component included in the disclosure is expressed as singular or plural according to the presented specific embodiment. However, the singular or plural expression is chosen appropriately to the situation presented for convenience of explanation, so that the disclosure is not limited to the singular or plural components, and a component expressed as plural may be configured as singular or a component expressed as singular may be configured as plural.

Meanwhile, although specific embodiments have been described in the detailed description of the disclosure, various modifications are possible without departing from the scope of the disclosure. Therefore, the scope of the disclosure should not be limited to the described embodiments and should be defined not only by the claims described below but also by the claims and equivalents thereof.

The invention claimed is:

1. An electronic device comprising:
a display panel including an active area in which data is displayed and an edge area disposed along an outer circumferential surface of the active area;
an opaque printed layer surrounding the edge area;
a substrate, disposed on the display panel, and having a first area above the active area of the display panel and a second area above the edge area of the display panel;
a metal mesh electrode pattern disposed on the first area and the second area; and
a plurality of trace wires disposed on the substrate and electrically coupled to the metal mesh electrode pattern,
wherein the metal mesh electrode pattern includes:
a first electrode pattern having a lattice structure; and
a second electrode pattern positioned above the first electrode pattern and having a lattice structure, the first and second electrode patterns being disposed to intersect with each other, and
wherein a disconnection part is disposed at at least a partial area of the metal mesh electrode pattern disposed on the second area.

2. The electronic device of claim 1,
wherein the disconnection part is disposed at a predetermined distance apart from an outer circumferential surface of the first area.

3. The electronic device of claim 2,
wherein the second area includes:
a first edge provided along one side surface of the first area;
a second edge provided in a direction opposite to the first edge;
a third edge provided in a direction perpendicular to the first edge and the second edge; and
a fourth edge provided in a direction opposite to the third edge.

4. The electronic device of claim 3,
wherein the disconnection part is provided at at least a partial area of a first electrode pattern provided in the second area along the first edge or the second edge, disconnecting the first electrode pattern, and
wherein a first portion of the plurality of trace wires are electrically coupled with the second electrode pattern in the second area along the first edge or the second edge.

5. The electronic device of claim 4,
wherein the disconnection part is provided at at least a partial area of a second electrode pattern provided in the second area along the third edge or the fourth edge, disconnecting the second electrode pattern, and
wherein a second portion of the plurality of trace wires are electrically coupled with the first electrode pattern in the second area along the third edge or the fourth edge.

6. The electronic device of claim 1, further comprising:
a polarizing layer disposed above the metal mesh electrode pattern.

7. The electronic device of claim 1, further comprising:
a polarizing layer disposed between the substrate and the display panel.

8. The electronic device of claim 1, further comprising:
a first insulating layer disposed between the first electrode pattern and the second electrode pattern.

9. The electronic device of claim 4, further comprising:
a second insulating layer disposed above the second electrode pattern; and
a third insulating layer disposed between the first electrode pattern and the substrate.

10. An electronic device comprising:
a display panel including an active area where data is displayed and an edge area disposed along an outer circumferential surface of the active area;
an opaque printed layer surrounding the edge area;
a substrate disposed the display panel and includes a first area above the active area and a second area above the edge area;
a metal mesh electrode pattern disposed on the first area and the second area; and
a plurality of trace wires positioned on the substrate and are electrically coupled to the metal mesh electrode pattern,
wherein the metal mesh electrode pattern includes:
a first electrode pattern having a lattice structure; and
a second electrode pattern disposed above the first electrode pattern and having a lattice structure, the first and second electrode patterns being disposed to intersect with each other,
wherein a first electrode pattern and a second electrode pattern are provided at the first area, and
only one of the first electrode pattern and the second electrode pattern is provided at at least a partial area of the second area.

11. The electronic device of claim 10,
wherein the first electrode pattern and the second electrode pattern are provided in an area of the second area positioned within a predetermined distance from an outer circumferential surface of the first area, and
wherein the one of the first electrode pattern and the second electrode pattern is provided in an area of the second area distanced, by a predetermined distance or more, from the outer circumferential surface of the first area.

12. The electronic device of claim 11,
wherein the second area includes:
a first edge provided along one side surface of the first area;
a second edge provided in a direction opposite to the first edge;
a third edge provided in a direction perpendicular to the first edge and the second edge; and
a fourth edge provided in a direction opposite to the third edge.

13. The electronic device of claim 12
wherein only the first electrode pattern is provided at at least a partial area of the second area along the first edge or the second edge.

14. The electronic device of claim 13, further including a first metal pattern and a first dummy pattern positioned on an area in which only the first electrode pattern of the substrate is disposed,
wherein the first metal pattern and the first dummy pattern are arranged between lattices configured by the first electrode pattern.

15. The electronic device of claim 13,
wherein only the second electrode pattern is provided at at least a partial area of the second area along the third edge or the fourth edge.

16. The electronic device of claim 15, further comprising a second metal pattern and a second dummy pattern positioned on an area in which only the second electrode pattern of the substrate is disposed,
wherein the second metal pattern and the second dummy pattern are arranged between the lattices configured by the second electrode pattern.

17. The electronic device of claim 10, further comprising:
a polarizing layer disposed above the metal mesh electrode pattern.

18. The electronic device of claim 10, further comprising:
a polarizing layer disposed between the substrate and the display panel.

19. The electronic device of claim 10, further comprising:
a first insulating layer disposed between the first electrode pattern and the second electrode pattern.

20. The electronic device of claim 19, further comprising:
a second insulating layer disposed above the second electrode pattern; and
a third insulating layer disposed between the first electrode pattern and the substrate.

* * * * *